(12) United States Patent
Jang

(10) Patent No.: US 10,927,743 B2
(45) Date of Patent: Feb. 23, 2021

(54) DEVICE FOR EXHAUST SYSTEM OF VEHICLE

(71) Applicants: Hyundai Motor Company, Seoul (KR); Kia Motors Corporation, Seoul (KR)

(72) Inventor: Chun Soon Jang, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/452,131

(22) Filed: Jun. 25, 2019

(65) Prior Publication Data

US 2020/0232369 A1  Jul. 23, 2020

(30) Foreign Application Priority Data

Jan. 21, 2019  (KR) ......................... 10-2019-0007256

(51) Int. Cl.
*F01N 3/28* (2006.01)
(52) U.S. Cl.
CPC ......... *F01N 3/2853* (2013.01); *F01N 3/2878* (2013.01)
(58) Field of Classification Search
CPC .... F01N 3/2853; F01N 3/2878; F16L 23/032; F16L 23/036; F16L 23/08; F16L 23/16; F16L 37/146
See application file for complete search history.

(56) References Cited

U.S. PATENT DOCUMENTS

| | | | | |
|---|---|---|---|---|
| 5,683,119 A * | 11/1997 | Emmons | ............... | F16L 27/053 285/146.3 |
| 5,775,701 A * | 7/1998 | Martini | ............... | F16J 15/0887 277/591 |
| 8,662,544 B2 * | 3/2014 | Broderick | ............. | F16L 27/073 285/334.5 |
| 8,904,766 B2 * | 12/2014 | Saito | ..................... | F01N 13/009 60/299 |
| 9,400,052 B2 * | 7/2016 | Ishihata | ............... | F16L 23/162 60/298 |
| 2005/0166584 A1 * | 8/2005 | Kerchner | ............ | F16J 15/0818 60/298 |
| 2012/0139188 A1 * | 6/2012 | Schweiger | .......... | F01N 13/1827 277/594 |
| 2016/0109045 A1 * | 4/2016 | Jang | ......................... | F01N 3/28 285/189 |
| 2018/0100427 A1 * | 4/2018 | Tsukiyama | ............ | F02B 37/004 |
| 2019/0285210 A1 * | 9/2019 | Takahara | ................ | F02B 39/00 |

* cited by examiner

*Primary Examiner* — Matthew T Largi
(74) *Attorney, Agent, or Firm* — Morgan, Lewis & Bockius LLP

(57) ABSTRACT

A clamping assembly configured for an exhaust system of a vehicle may include a gasket engaged to be prevented from deviating using a method in which a pin is inserted into and engaged with a pin hole at an inlet pipe flange of a catalytic converter, wherein an outlet pipe flange of a turbocharger and an inlet pipe flange of the catalytic converter are clamped by a clamp by interposing the gasket between the outlet pipe flange of the turbocharger and the inlet pipe flange of the catalytic converter.

9 Claims, 7 Drawing Sheets

DEVICE FOR EXHAUST SYSTEM OF VEHICLE

CROSS-REFERENCE TO RELATED APPLICATION

The present application claims priority to Korean Patent Application No. 10-2019-0007256 filed on Jan. 21, 2019, the entire contents of which is incorporated herein for all purposes by this reference.

BACKGROUND OF THE INVENTION

Field of the Invention

The present invention relates to a clamping assembly for an exhaust system of a vehicle. More particularly, it relates to a clamping assembly configured for an exhaust system of a vehicle, in which a deviation prevention structure and a structure capable of verifying whether a gasket is disposed are applied to the gasket located between a turbocharger and a catalytic converter and configured to be clamped.

Description of Related art

A warming-up catalytic converter (WCC) which is a type of an exhaust gas post-treatment device has been disposed at an exhaust system of an engine to which a turbocharger is applied to effectively oxidize not only CO and HrC components contained in the exhaust gas but also an SOF component contained therein.

In the instant case, to prevent the exhaust gas from flowing out to the outside through a connection portion between the turbocharger and the catalytic converter, an outlet flange of the turbocharger and an inlet flange of the turbocharger are coupled to be sealable by interposing a gasket.

FIG. 1 illustrates a conventional engagement structure between an outlet pipe of a turbocharger and an inlet pipe of a catalytic converter.

As shown in FIG. 1, an outlet pipe flange 12 of a turbocharger 10 and an inlet pipe flange 32 of a catalytic converter 30 are in close contact with each other to be sealable by interposing a hidden type gasket 1 therebetween, and a clamp 40 is engaged with external circumferential portions of flanges 12 and 32 in close contact with each other such that the turbocharger 10 and the catalytic converter 30 are assembled.

That is, when an operator performs an assembly work to connect an inlet pipe of the catalytic converter 30 to an outlet pipe of the turbocharger 10, the hidden type gasket 1 is inserted between the outlet pipe flange 12 of the turbocharger 10 and the inlet pipe flange 32 of the catalytic converter 30, and then the clamp 40 is engaged with the external circumferential portions of flanges 12 and 32 in close contact with each other such that the assembly work between the turbocharger 10 and the catalytic converter 30 is completed.

More specifically, a gasket insertion groove 11 for preventing deviation of the gasket 1 and fixing the gasket 1 is formed at one surface of the outlet pipe flange 12 of the turbocharger 10. Consequently, after the gasket 1 is inserted into a gasket insertion groove 11, the inlet pipe flange 32 of the catalytic converter 30 is brought into close contact with one surface of the outlet pipe flange 12 into which the gasket 1 inserted, and then the clamp 40 is engaged with the external circumferential portions of the flanges 12 and 32 which are in close contact with each other such that the turbocharger 10 and the catalytic converter 30 are assembled with each other to be sealable.

In the instant case, in a state in which the gasket 1 is inserted into the gasket insertion groove 11 formed at the outlet pipe flange 12 of the turbocharger 10, the inlet pipe flange 32 of the catalytic converter 30 is brought into close contact with one surface of the outlet pipe flange 12 and thus the gasket 1 becomes in a hidden state such that the gasket 1 is in an invisible state when viewed from the outside.

Consequently, after the operator completes the assembly work of connecting the inlet pipe of the catalytic converter 30 to the outlet pipe of the turbocharger 10, the gasket 1 is in the invisible state such that there is a state in which whether the gasket 1 is disposed cannot be verified.

Thus, after the operator completes the assembly work of connecting the inlet pipe of the catalytic converter 30 to the outlet pipe of the turbocharger 10, there is a demand for a method of verifying whether the gasket 1 is disposed.

As a method of verifying the gasket 1 is disposed, a method of exposing an external circumferential surface of a gasket to the outside and allowing an operator to directly and visually verify the gasket may be applied.

To the present end, instead of the conventional hidden type gasket 1, a method of clamping between an outlet pipe of a turbocharger and an inlet pipe of a catalytic converter to be sealable may be applied by providing a gasket having a flat cross section as well as a structure in which a thickness is increased than that of the conventional hidden type gasket 1 to allow an external circumferential surface of the gasket to be seen clearly.

However, as described above, when the gasket having the flat cross section as well as the structure in which the thickness is increased than that of the conventional hidden type gasket 1 is disposed between the outlet pipe of the turbocharger and the inlet pipe of the catalytic converter for assembly, since a portion for holding the gasket is not present, there is a problem in that the gasket may deviate from a home position for installation and leakage of an exhaust gas may occur due to the deviation of the gasket.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clamping assembly configured for an exhaust system of a vehicle configured for mounting a gasket between an outlet pipe flange of a turbocharger and an inlet pipe flange of a catalytic converter to prevent deviation of the gasket and allowing, after the gasket is disposed, an operator to easily and visually verify whether the gasket is disposed.

Various aspects of the present invention are directed to providing a clamping assembly configured for an exhaust system of a vehicle, in which a gasket is engaged to be prevented from deviating using a method in which a pin is inserted into and engaged with a pin hole at an inlet pipe flange of a catalytic converter, and an inlet pipe flange of a turbocharger and an inlet pipe flange of the catalytic converter are clamped by a clamp by interposing the gasket between the inlet pipe flange of the turbocharger and the inlet pipe flange of the catalytic converter, wherein the pin is formed to protrude from the inlet pipe flange of the catalytic converter and the pin hole is formed to pass through the gasket such that the gasket is brought into close contact with the inlet pipe flange of the catalytic converter and, at the same time, the pin is inserted into and engaged with the pin hole.

The pin may include a small diameter end portion integrally formed on the inlet pipe flange of the catalytic converter and a large diameter end portion integrally formed on a front end portion of the small diameter end.

The pin hole may be formed such that a large diameter hole into which a large diameter end portion of the pin is insertable and a small diameter hole for which a small diameter end portion thereof is inserted into and engaged with are formed to be communicable with each other.

A center portion of the large diameter hole of the pin hole may be aligned on a same circumference with that of the small diameter hole of the pin hole in a circumferential direction of the gasket.

An engagement groove into which a large diameter end portion of the pin is inserted may be formed on the outlet pipe flange of the turbocharger.

The gasket may be provided in an annular shape having a flat cross section, and an external circumferential surface of the gasket may be externally exposed through between the outlet pipe flange of the turbocharger and the inlet pipe flange of the catalytic converter.

The gasket may include a main plate made of a steel material, a plate for increasing a thickness made of a steel material and stacked on a portion of a surface of the main plate, a plate for maintaining sealing made of an elastic material and stacked on the remaining surface of the main plate, and a cover plate for surrounding the main plate, the plate for increasing a thickness, and the plate for maintaining sealing.

Other aspects and exemplary embodiments of the invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
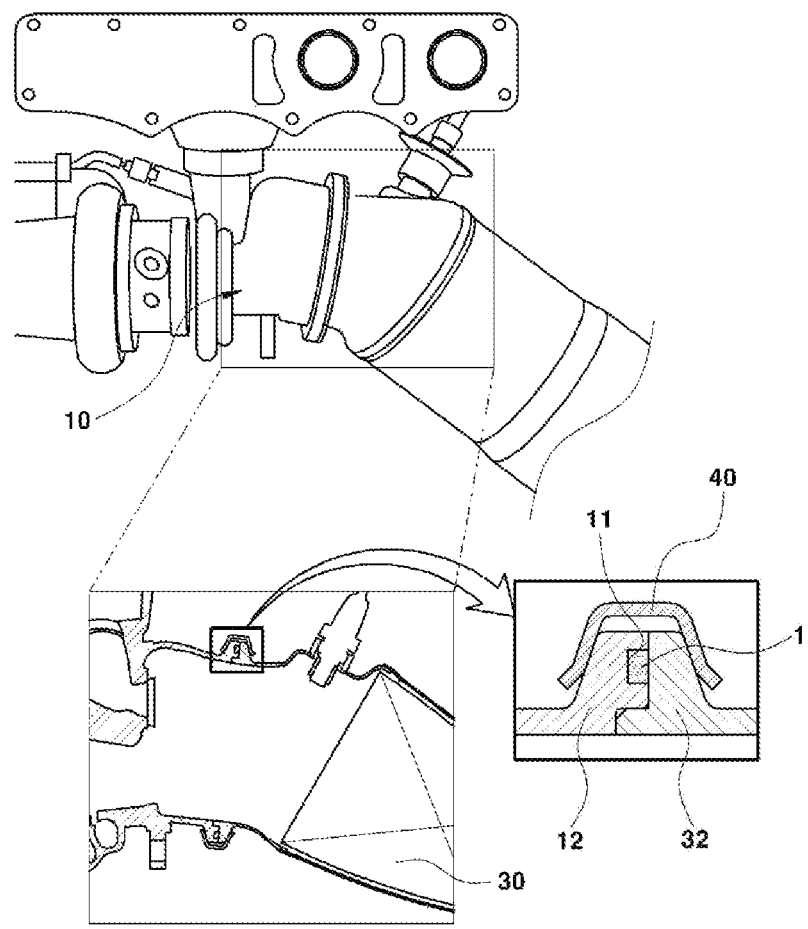
FIG. 1 is a cross-sectional view exemplarily illustrating a conventional engagement structure between an outlet pipe of a turbocharger and an inlet pipe of a catalytic converter.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

Figure 2:
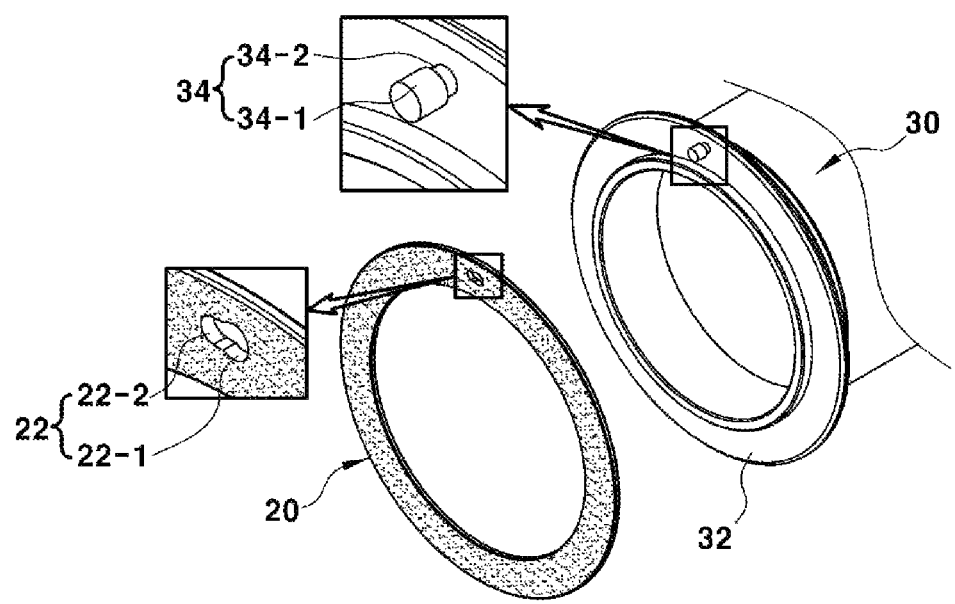
FIG. 2 is an exploded perspective view exemplarily illustrating structures of a gasket and the inlet pipe of the catalytic converter of a clamping assembly configured for an exhaust system of a vehicle according to an exemplary embodiment of the present invention.
Figure 3A:
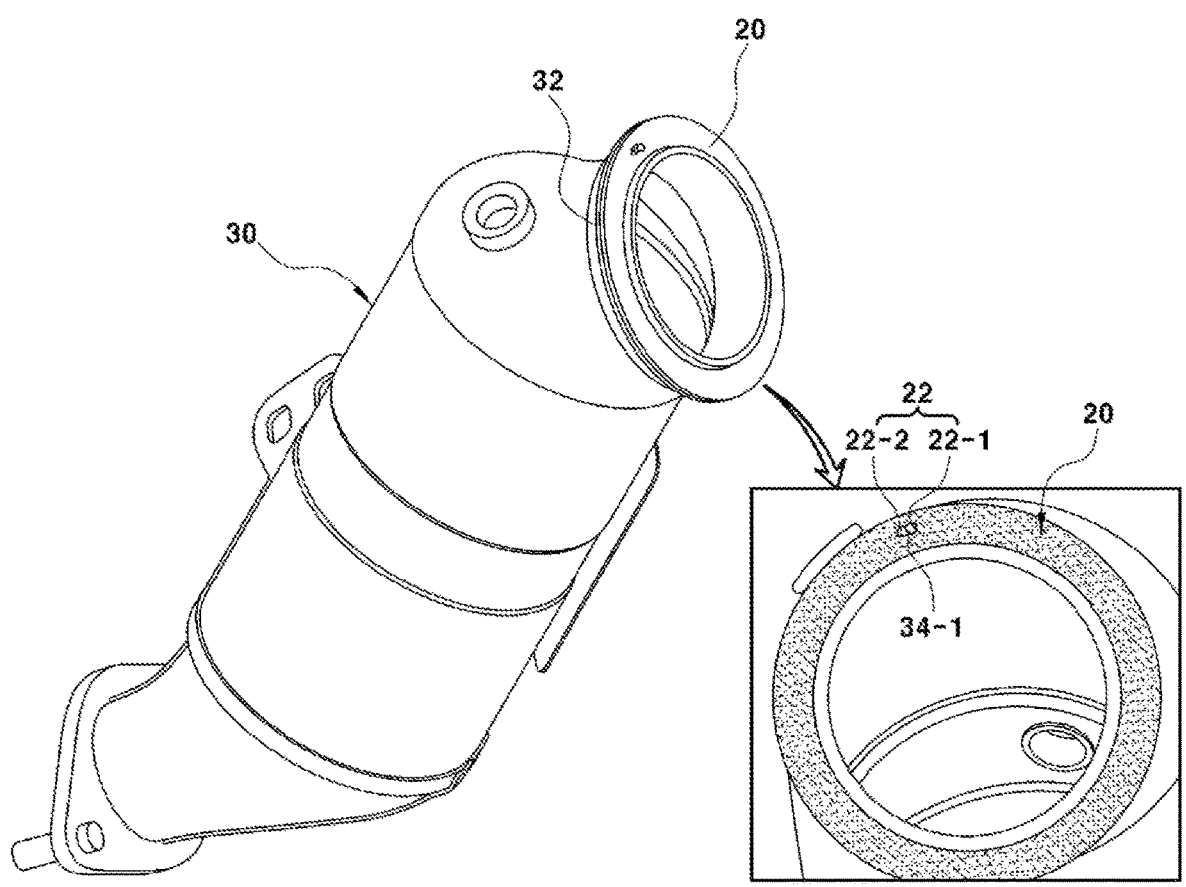
FIG. 3A and FIG. 3B are perspective views illustrating a process of engaging the gasket to the inlet pipe of the catalytic converter which are as the clamping assembly configured for an exhaust system of a vehicle according to an exemplary embodiment of the present invention.
Figure 3B:
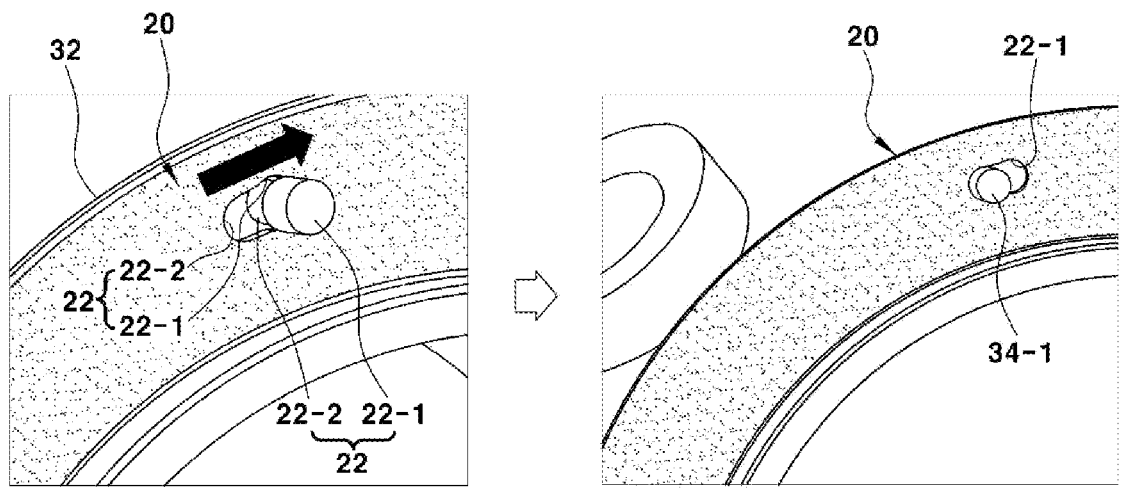

FIG. 2 is a perspective view exemplarily illustrating structures of a gasket and the inlet pipe of the catalytic converter among configurations of a clamping assembly configured for an exhaust system of a vehicle according to an exemplary embodiment of the present invention, and FIG. 3A and FIG. 3B illustrate a process of engaging the gasket to the inlet pipe of the catalytic converter according to an exemplary embodiment of the present invention.

The present invention is characterized in that a pin 34 engages a gasket 20 to be sealable with respect to an inlet pipe flange 32 of a catalytic converter 30 using a method of inserting the pin 34 into a pin hole 22 to engage the pin 34 therewith, and the outlet pipe flange 12 of the turbocharger 10 and the inlet pipe flange 32 of the catalytic converter 30 are clamped by a clamp 40, preventing the gasket 20 from deviating from a home position to allow the gasket 20 to perform a sealing maintaining function.

To the present end, the pin 34 is integrally formed to protrude from the inlet pipe flange 32 of the catalytic converter 30, and the pin hole 22 is formed to pass through the gasket 20, and when the gasket 20 is brought into close contact with the inlet pipe flange 32 of the catalytic converter 30, the pin 34 is inserted into and engaged with the pin hole 22 such that the gasket 20 becomes a state of being prevented from deviating and fixed at a home position for installation.

In particular, as shown in FIG. 2, the pin 34 integrally formed at the inlet pipe flange 32 of the catalytic converter 30 includes a small diameter end portion 34-2 integrally formed at the inlet pipe flange 32 of the catalytic converter 30, and a large diameter end portion 34-1 integrally formed to extend from a front end portion of the small diameter end portion 34-2.

Furthermore, as shown in FIG. 2, the pin hole 22 formed at the gasket 20 is formed in a structure in which a large diameter hole 22-1 having a diameter into which the large diameter end portion 34-1 of the pin 34 is insertable is communicable with a small diameter hole 22-2 having a diameter for which the small diameter end portion 34-2 of the pin 34 is insertable into and engageable with.

A center portion of the large diameter hole 22-1 of the pin hole 22 is aligned on a same circumference with a center portion of the small diameter hole 22-2 thereof in a circumferential direction of the gasket 20, and the large diameter hole 22-1 and the small diameter hole 22-2 are formed to be communicable with each other.

Thus, as shown in FIG. 3A, while the large diameter end portion 34-1 of the pin 34 passes through via the large diameter hole 22-1 of the gasket 20, one surface of the gasket 20 is brought into contact with the inlet pipe flange 32 of the catalytic converter 30.

Subsequently, as shown in FIG. 3B, when an operator rotates the gasket 20 in one direction thereof, the small diameter end portion 34-2 of the pin 34 is inserted into and engaged with the small diameter hole 22-2 of the gasket 20 such that the gasket 20 is located at the home position for installation on the inlet pipe flange 32 of the catalytic converter 30 and, simultaneously, becomes in state of being fixed to be able to be prevented from deviating.

In the instant case, a length of the small diameter end portion 34-2 of the pin 34 is formed to meet a thickness of the gasket 20 such that the large diameter end portion 34-1 of the pin 34 becomes in a state of protruding from the other surface of the gasket 20.

Meanwhile, an engagement groove 14 into which the large diameter end portion 34-1 of the pin 34 is inserted is formed at the outlet pipe flange 12 of the turbocharger 10.

Subsequently, as described above, when the outlet pipe flange 12 of the turbocharger 10 is brought into close contact with the other surface of the gasket 20 in the state of being fixed to the inlet pipe flange 32 of the catalytic converter 30, the large diameter end portion 34-1 of the pin 34 protruding from the other surface of the gasket 20 is inserted into and engaged with the engagement groove 14 formed at the outlet pipe flange 12 of the turbocharger 10.

In the instant case, the large diameter end portion 34-1 of the pin 34 is configured to guide an engagement position of the outlet pipe flange 12 of the turbocharger 10 to the home position such that the outlet pipe flange 12 of the turbocharger 10 and the inlet pipe flange 32 of the catalytic converter 30 form a correct matching position by interposing the gasket 20 therebetween.

Next, as described above, in a state in which the outlet pipe flange 12 of the turbocharger 10 and the inlet pipe flange 32 of the catalytic converter 30 are in close contact with each other by interposing the gasket 20 interposed therebetween, the flanges 12 and 32 are tightened and engaged with each other by the clamp 40.

Figure 4:
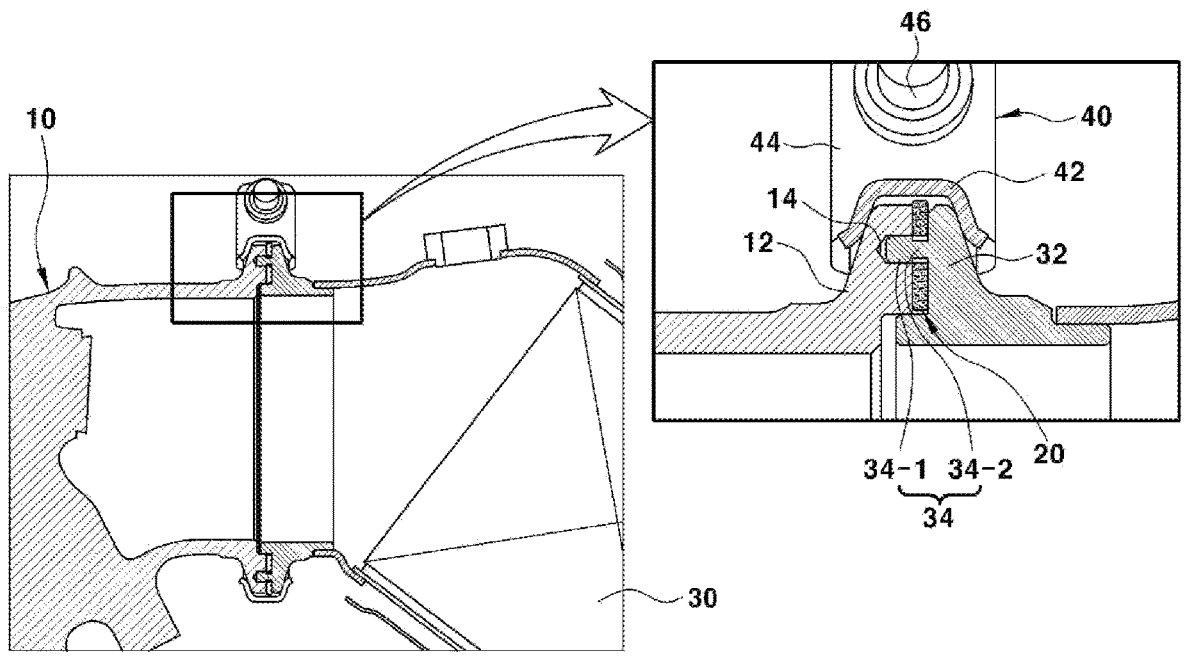
FIG. 4 is a cross-sectional view exemplarily illustrating an assembly state of the clamping assembly configured for an exhaust system of a vehicle according to an exemplary embodiment of the present invention.

Referring to FIG. 4, the clamp 40 includes a clamping ring 42 configured to surround and tighten the outlet pipe flange 12 and the inlet pipe flange 32 which are in close contact with each other, a locking end portion 44 bent outward at both end portions of the clamping ring 42, and a clamping bolt 46 configured to tighten to be engaged with each of the locking end portions 44.

Consequently, as described above, in a state in which the gasket 20 is engaged and fixed between the outlet pipe flange 12 of the turbocharger 10 and the inlet pipe flange 32 of the catalytic converter 30, a process of surrounding and tightening the external circumferential portions of the flanges 12 and 32 which are in close contact with each other to locate the flanges 12 and 32 inside the clamping ring 42 of the clamp 40 and a process of engaging and tightening the locking end portions 44 formed at both end portions of the clamping ring 42 by the clamping bolt 46 are performed such that the outlet pipe flange 12 and the inlet pipe flange 32 become in an engagement state by the clamp 40 by interposing the gasket 20 between the outlet pipe flange 12 and the inlet pipe flange 32.

In an exemplary embodiment of the present invention, the clamping bolt 46 is configured to be engaged into a threaded opening formed in the locking end portions 44 such that the outlet pipe flange 12 and the inlet pipe flange 32 become in an engagement state by the clamp 40 by rotating the clamping bolt 46.

As described above, the pin 34 having the small diameter end portion 34-2 and the large diameter end portion 34-1 is formed on the inlet pipe flange 32 of the catalytic converter 30, and the large diameter hole 22-1 into which the large diameter end portion 34-1 of the pin 34 is inserted and the small diameter end portion 22-2 for which the small diameter end portion 34-2 of the pin 34 are inserted into and engaged with are formed to be communicable with each other at the gasket 20. Consequently, during assembly of a gasket, the gasket 20 may be easily located at the home position and deviation of the gasket 20 from the home position may be easily prevented such that a gasket assembly work by the operator may be performed very easily.

Meanwhile, the present invention is also characterized in that the external circumferential surface of the gasket 20 disposed between the outlet pipe flange 12 of the turbocharger 10 and the inlet pipe flange 32 of the catalytic converter 30 is externally exposed such that the operator may directly and visually verify whether the gasket 20 is disposed.

Figure 5:
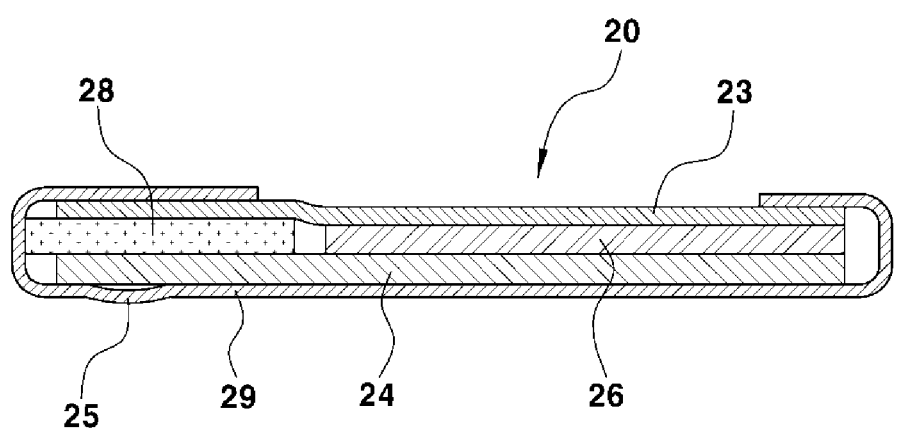
FIG. 5 is a cross-sectional view exemplarily illustrating a thickness increase structure of the gasket among configurations of the clamping assembly configured for an exhaust system of a vehicle according to an exemplary embodiment of the present invention.
Figure 6:
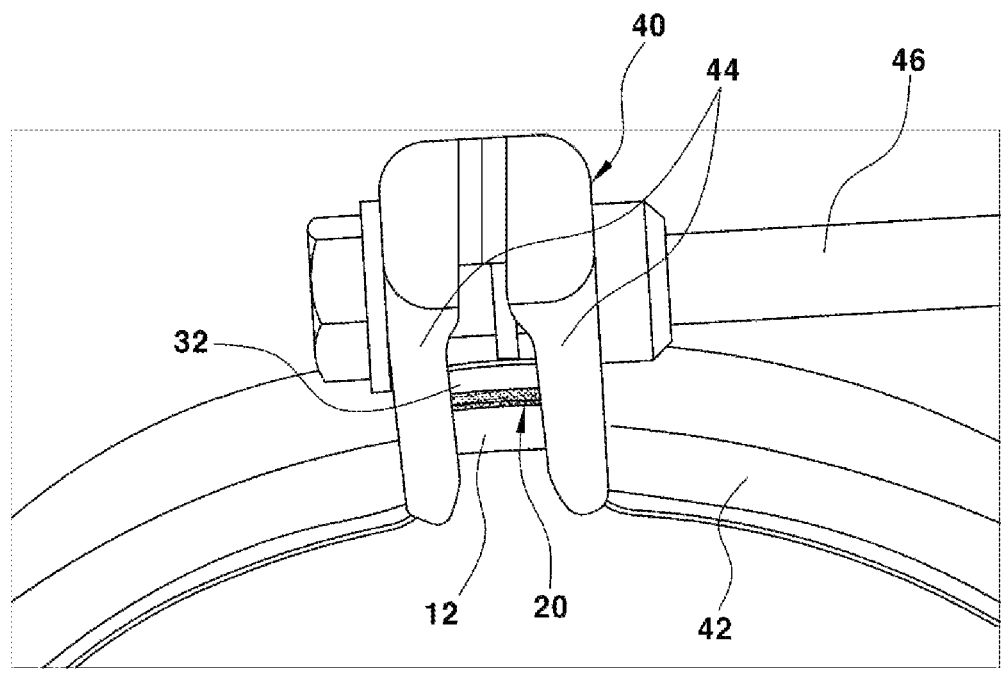
FIG. 6 is a perspective view exemplarily illustrating an example in which an external circumferential surface of the gasket is externally exposed after the clamping assembly configured for an exhaust system of a vehicle according to an exemplary embodiment of the present invention is assembled.

Referring to FIG. 5 illustrating a state in which the outlet pipe flange 12 of the turbocharger 10 and the inlet pipe flange 32 of the catalytic converter 30 are engaged with each other by the clamp 40 by interposing the gasket 20 between the outlet pipe flange 12 of the turbocharger 10 and the inlet pipe flange 32 of the catalytic converter 30, it may be seen that the external circumferential surface of the gasket 20 is exposed to the outside.

That is, as described above, in the state in which the outlet pipe flange 12 of the turbocharger 10 and the inlet pipe flange 32 of the catalytic converter 30 are engaged with each other by the clamp 40 by interposing the gasket 20 between the outlet pipe flange 12 of the turbocharger 10 and the inlet pipe flange 32 of the catalytic converter 30, the external circumferential surface of the gasket 20 becomes in a state of being externally exposed through a space between the locking end portions 44 formed at both of the end portions of the clamping ring 42 such that the operator may directly look the external circumferential surface of the gasket 20 to accurately verify whether the gasket 20 is disposed.

In an exemplary embodiment of the present invention, the gasket 20 may include a sealing protrusion 25 protrudingly formed on a surface of the gasket 20 to increase the sealing performance.

The external circumferential surface of the gasket 20 is further coated with a color material which is visually easy to be verified such that, when viewed from the outside, visibility for verifying whether the gasket 20 is disposed may be more secured.

Furthermore, when a thickness of the gasket 20 is increased as compared with that of a conventional gasket, an external circumferential area of the gasket 20 externally exposed is increased such that the visibility for verifying whether the gasket 20 is disposed may be more secured.

When the thickness of the gasket 20 is increased, there is a concern that the gasket 20 may deviate from the home position for installation due to a weight of the gasket 20 but, owing to the above-described structure of the pin 34 and the pin hole 22, the gasket 20 is in a state of being fixed to prevent deviation of the gasket 20 such that the thickness may be increased.

To the present end, the gasket 20 includes a main plate 24 made of a steel material, a plate 26 for increasing a thickness made of a steel material and stacked on a portion of a surface of the main plate 24, a plate 28 for maintaining sealing made of an elastic material and stacked on the remaining surface of the main plate 24, and a cover plate 29 for covering the main plate 24, the plate 26 for an increased a thickness, and the plate 28 for maintaining sealing.

In an exemplary embodiment of the present invention, the gasket 20 include an additional plate 23 to support the plate 26 and the plate 28. An end portion of the cover plate 29 is mounted on an end portion of the additional plate 23 and another end portion of the cover plate 29 is mounted on another end portion of the additional plate 23.

As described above, an overall thickness of the gasket 20 may be increased due to the plate 26 for increasing a thickness stacked on the main plate 24, and to further secure a sealing maintaining function according to a thickness increment, the plate 28 for maintaining sealing made of a compressible elastic material is stacked together with the plate 26 for increasing a thickness.

Consequently, as described above, in the state in which the outlet pipe flange 12 of the turbocharger 10 and the inlet pipe flange 32 of the catalytic converter 30 are engaged with each other by the clamp 40 by interposing the gasket 20 between the outlet pipe flange 12 of the turbocharger 10 and the inlet pipe flange 32 of the catalytic converter 30, the plate 28 for maintaining sealing is elastically compressed to ensure the sealing maintaining function of the gasket 20. In particular, since the overall thickness of the gasket 20 is in a state of being increased by the plate 26 for increasing a thickness and the plate 28 for maintaining sealing, the external circumferential area of the gasket 20 externally exposed is increased such that the operate may visually verify more accurately whether the gasket 20 is disposed.

As described above, the turbocharger 10 and the catalytic converter 30 may be assembled to maintain to be sealable by interposing the gasket 20 between the turbocharger 10 and the catalytic converter 30 and, at the same time, the operator may easily verify whether the gasket 20 is disposed such that it is possible to completely prevent an assembly defect in which the gasket 20 is erroneously omitted when the operator perform an assembly work.

Various aspects of the present invention provide the following effects through the above-described problem solving means.

First, a pin having a small diameter end portion and a large diameter end portion is formed on an inlet pipe flange of a catalytic converter, and a large diameter hole into which the large diameter end portion of the pin is inserted and a small diameter hole for which the small diameter end portion of the pin is inserted into and engaged with are formed at a gasket such that it is possible to easily locate the gasket at a home position for installation when the gasket is mounted and to easily prevent deviation of the gasket from the home position.

Second, an external circumferential surface of the gasket disposed between an outlet pipe flange of a turbocharger and an inlet pipe flange of a catalytic converter is externally exposed such that the operator can verify whether the gasket is disposed by looking at the external circumferential surface of the gasket externally exposed before mounting a clamp.

Third, the gasket with an increased thickness as compared with that of the existing gasket is applied such that it is possible to improve visibility of verifying whether the gasket is disposed by increasing an exposed area of the external circumferential surface of the gasket according to the increase in thickness of the gasket.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clamping assembly for an exhaust system of a vehicle, the clamping assembly including:
    a gasket;
    a pin integrally formed at an inlet pipe flange of a catalytic converter, the pin including a first diameter end portion integrally formed on the inlet pipe flange of the catalytic converter and a second diameter end portion integrally formed on a front end portion of the first diameter end portion, wherein a diameter of the second diameter end portion is larger than a diameter of the first diameter end portion;
    a pin hole formed at the gasket, wherein the pin is configured to be selectively inserted into and engaged with the pin hole, the pin hole including a first diameter hole into which the second diameter end portion of the pin is selectively insertable and a second diameter hole into which the first diameter portion of the pin is selectively inserted and with which the first diameter portion of the pin is engaged with the second diameter hole of the gasket, wherein a diameter of the first diameter hole is larger than a diameter of the second diameter hole; and a clamp, wherein an outlet pipe flange of a turbocharger and the inlet pipe flange of the catalytic converter are clamped by the clamp while the gasket is interposed between the outlet pipe flange of the turbocharger and the inlet pipe flange of the catalytic converter, wherein the pin is formed to protrude from the inlet pipe flange of the catalytic converter, and wherein the gasket is brought into contact with the inlet pipe flange of the catalytic converter while the pin is inserted into and engaged with the pin hole.

2. The clamping assembly of claim 1, wherein a center portion of the first diameter hole of the pin hole is aligned on a same circumference with a center portion of the second diameter hole of the pin hole in a circumferential direction of the gasket.

3. The clamping assembly of claim 1, wherein an engagement groove into which the second diameter end portion of the pin is inserted is formed on the outlet pipe flange of the turbocharger.

4. The clamping assembly of claim 1, wherein the gasket is formed in an annular shape having a flat cross section, and wherein an external circumferential surface of the gasket is exposed to an outside through a space formed between first and second end portions of the clamp when the gasket is disposed between and in contact with the outlet pipe flange of the turbocharger and the inlet pipe flange of the catalytic converter.

5. The clamping assembly of claim 4, wherein the gasket further includes a sealing protrusion protrudingly formed on a surface of the gasket.

6. The clamping assembly of claim 1, wherein the gasket includes a main plate, a first plate stacked on a first portion of a surface of the main plate, a second plate stacked on a remaining portion of the surface of the main plate, and a cover plate for surrounding the main plate, the first plate, and the second plate.

7. The clamping assembly of claim 6, wherein the main plate is made of a steel material, the first plate is configured for increasing a thickness of the gasket and made of the steel material and the second plate is made of an elastic material for sealing.

8. The clamping assembly of claim 6, wherein the gasket further includes a third plate stacked on the first plate and the second plate, and wherein a first end portion of the cover plate is mounted on a first end portion of the third plate and a second end portion of the cover plate is mounted on a second end portion of the third plate.

9. The clamping assembly of claim 1, wherein the clamp includes:

a clamping ring configured to surround the outlet pipe flange and the inlet pipe flange;

locking end portions bent outward at first and second end portions of the clamping ring; and a clamping bolt penetrating the locking end portions and configured to tighten the locking end portions of the clamp.

* * * * *